United States Patent
Cheng

(10) Patent No.: US 6,786,180 B1
(45) Date of Patent: *Sep. 7, 2004

(54) SPOUT STRUCTURE OF A DRINKING FOUNTAIN FOR A PET

(76) Inventor: Chen Hui Cheng, No. 172, Lun-Mei Road., Chang Hua Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/352,460

(22) Filed: Jan. 29, 2003

(51) Int. Cl.$^7$ .................................................. A01K 7/00
(52) U.S. Cl. ....................................................... 119/72.5
(58) Field of Search ............................. 119/72, 72.5, 74, 119/725, 78, 477, 475; D7/312

(56) References Cited

U.S. PATENT DOCUMENTS

| | | | | |
|---|---|---|---|---|
| 4,807,567 A | * | 2/1989 | Atchley | 119/477 |
| 5,549,074 A | * | 8/1996 | Hui | 119/477 |
| 5,669,329 A | * | 9/1997 | Krause | 119/72.5 |
| 5,934,222 A | * | 8/1999 | Hwang | 119/72 |
| 6,435,134 B1 | * | 8/2002 | Ho | 119/72 |
| 6,561,129 B1 | * | 5/2003 | Cheng | 119/72.5 |

* cited by examiner

Primary Examiner—Thomas Price
(74) Attorney, Agent, or Firm—Harrison & Egbert

(57) ABSTRACT

A pet drinking fountain includes a water reservoir, a spout, a muzzle fastened to the outer end of the spout, and a stop ball movably disposed in the hollow interior of the muzzle such that the stop ball is partially emerged from an opening of the muzzle. The spout is provided in the longitudinal through hole with an air tube which is provided with an air passage and is smaller in diameter than the longitudinal through hole of the spout. The air tube is located in the spout such that the air passage of the air tube is in communication with the muzzle and the water reservoir, and such that the air tube and the inner wall of the longitudinal through hole of the spout form therebetween a water passage in communication with the water reservoir and the muzzle.

2 Claims, 15 Drawing Sheets

SPOUT STRUCTURE OF A DRINKING FOUNTAIN FOR A PET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a pet drinking fountain, and more particularly to a spout structure of the pet drinking fountain.

BACKGROUND OF THE INVENTION

As shown in FIG. 18, a pet drinking fountain 10 of the prior art comprises a water reservoir 11 and a spout 12. As the level of water in the water reservoir 11 is caused to drop due to water consumption by pets, a vacuum is formed in the water reservoir 11. Such a void space tends to hinder the discharge of water by the spout 12. The hindrance of water discharge becomes more apparent in the event that the water reservoir is relatively small in volume.

BRIEF SUMMARY OF THE INVENTION

The primary objective of the present invention is to provide a pet drinking fountain which is free of the deficiency of the prior art pet drinking fountain described above.

In keeping with the principle of the present invention, the foregoing objective of the present invention is attained by a pet drinking fountain comprising a water reservoir, a spout, and a muzzle in which a stop ball is movably held. The muzzle is fastened with the outer end of the spout. The spout is provided in the interior with an air tube which is provided with an air passage extending through both longitudinal ends of the air tube. The air tube is located in the interior of the spout such that the outer wall of the air tube and the inner wall of the spout form therebetween a water passage in communication with the interior of the water reservoir and the interior of the muzzle, and that the air passage of the air tube is in communication with the interior of the water reservoir and the interior of the muzzle.

The features and the advantages of the present invention will be more readily understood upon a thoughtful deliberation of the following detailed description of the present invention with reference to the accompanying drawings.

DETAILED DESCRIPTION OF THE INVENTION

Figure 1:
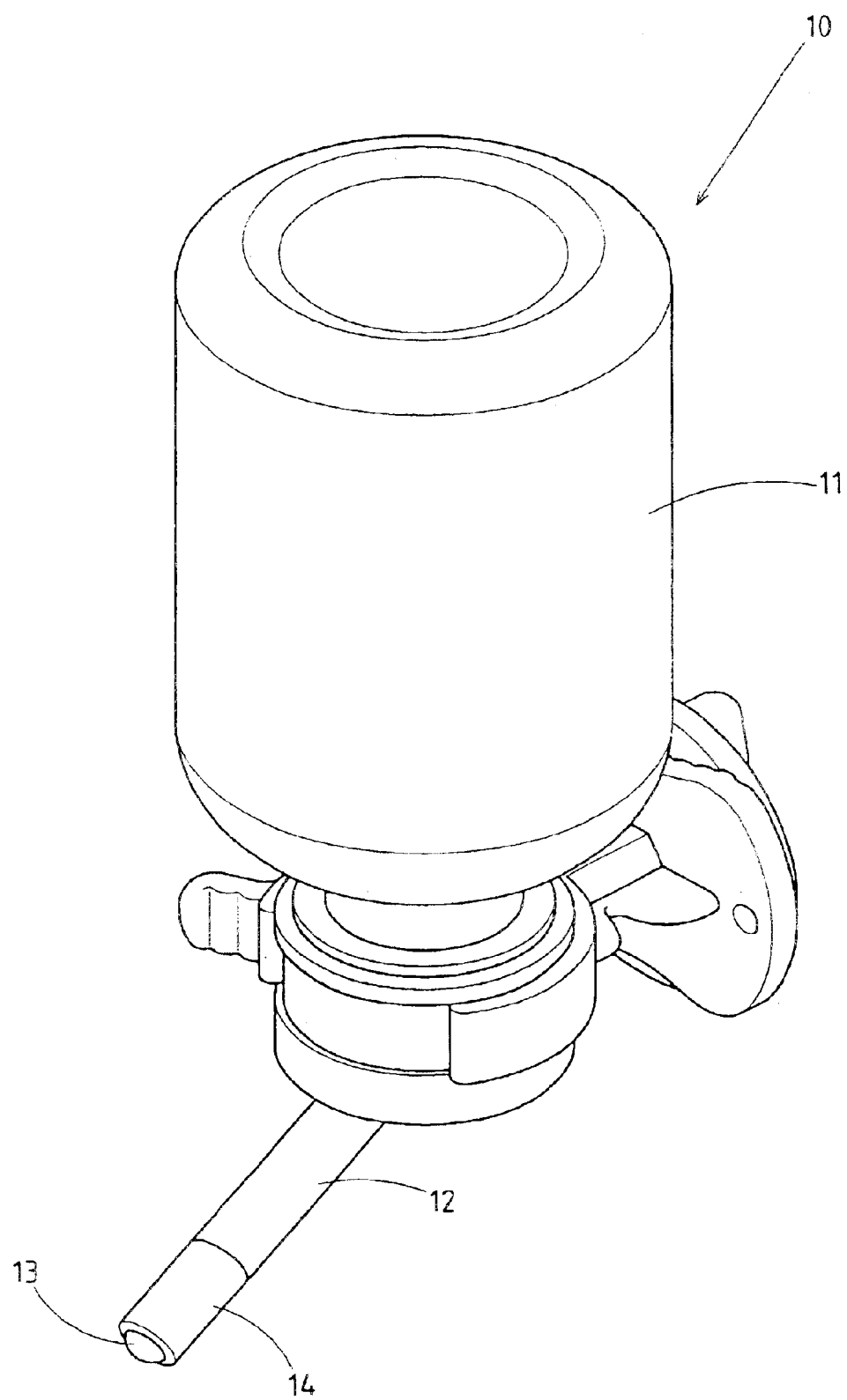
FIG. 1 shows a perspective view of a first preferred embodiment of the present invention.
Figure 2:
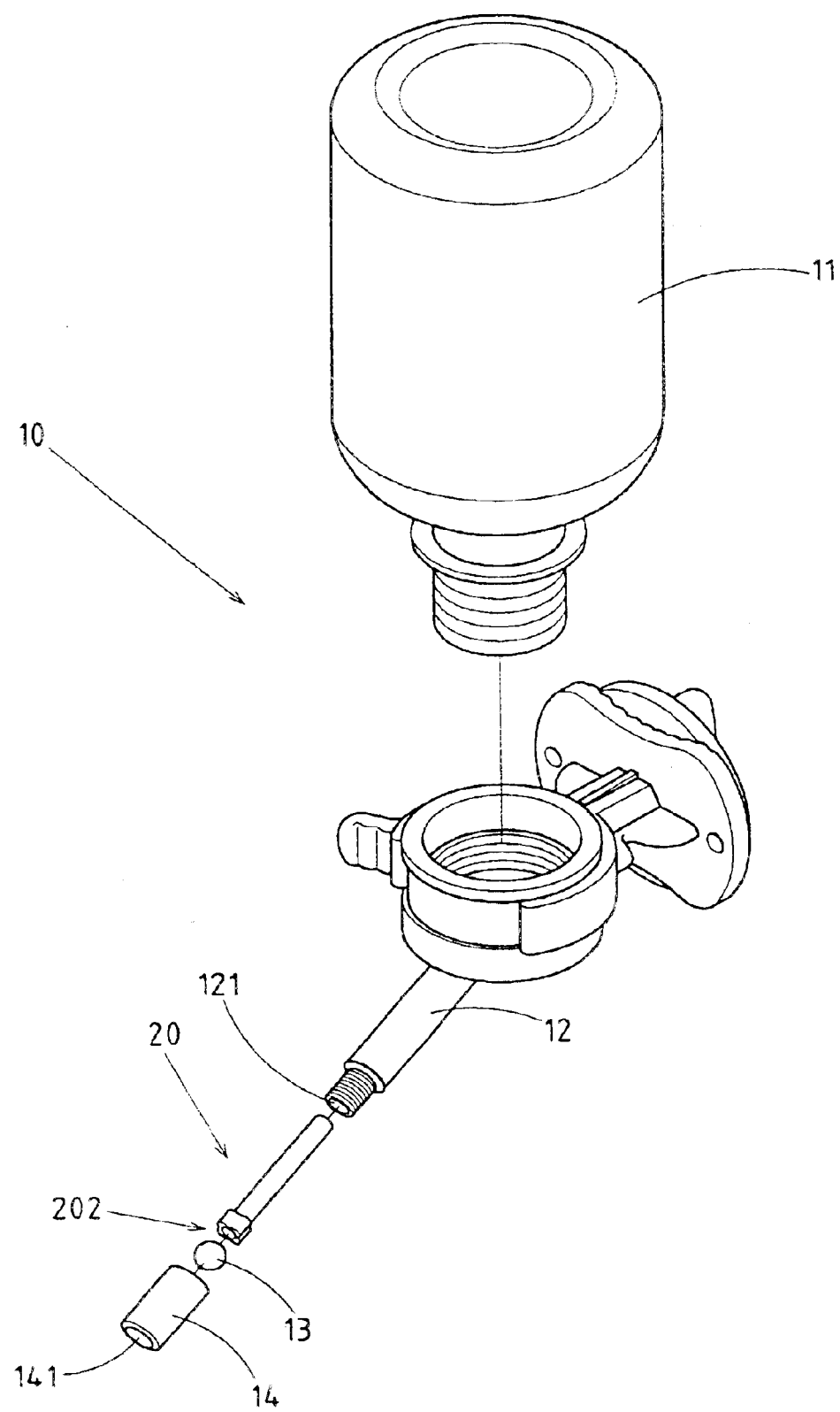
FIG. 2 shows an exploded perspective view of the first preferred embodiment of the present invention.
Figure 3:
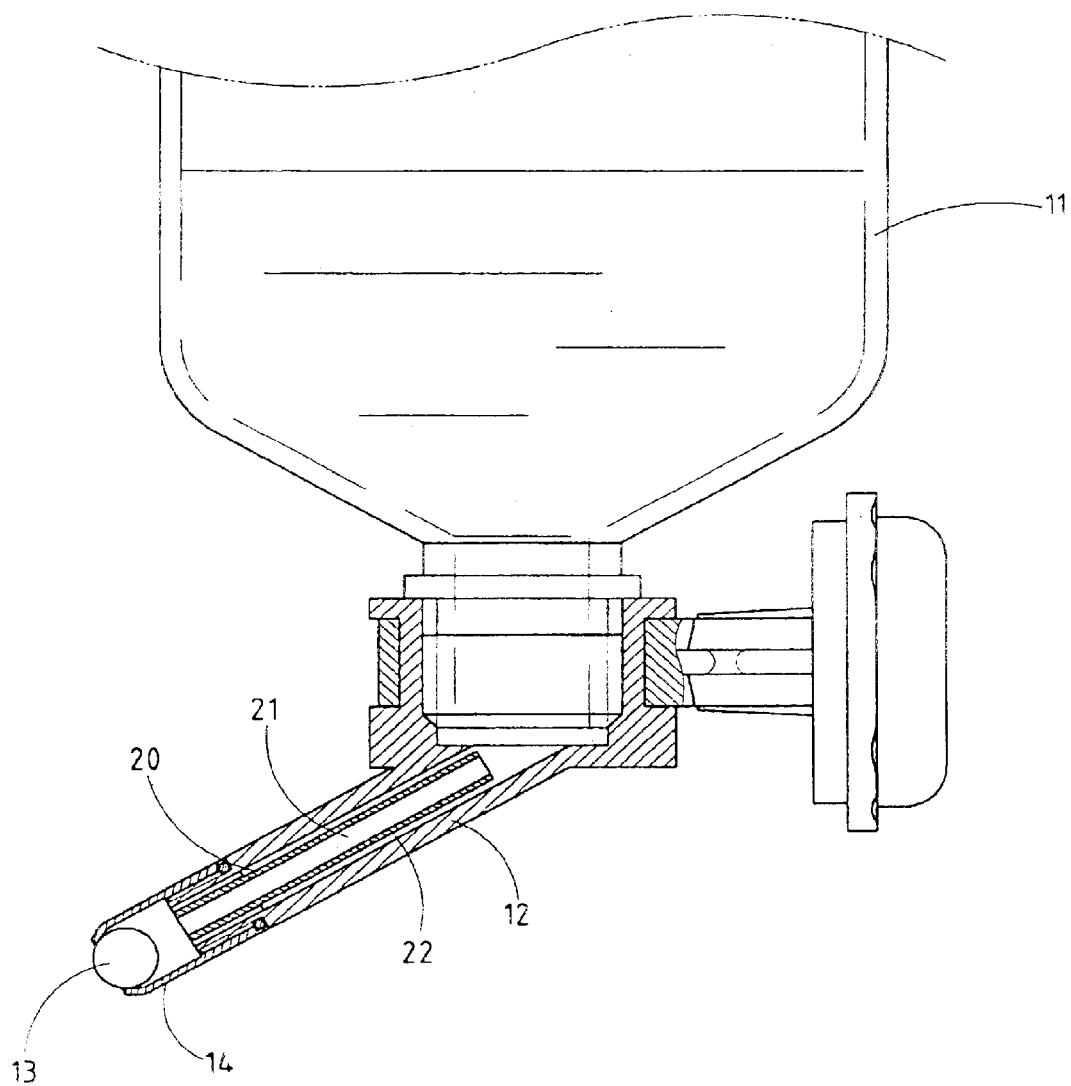
FIG. 3 shows a sectional schematic view of the first preferred embodiment of the present invention.
Figure 4:
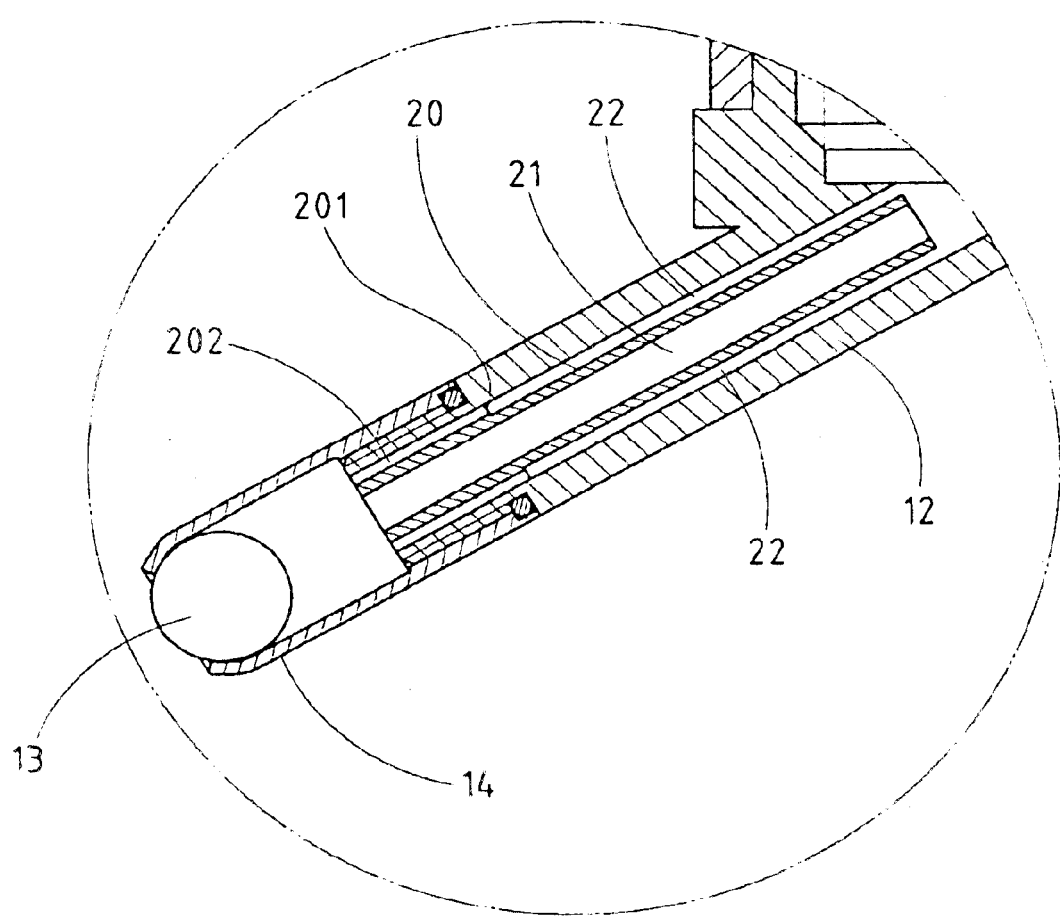
FIG. 4 shows an enlarged longitudinal sectional view of the spout of the first preferred embodiment of the present invention.
Figure 5:
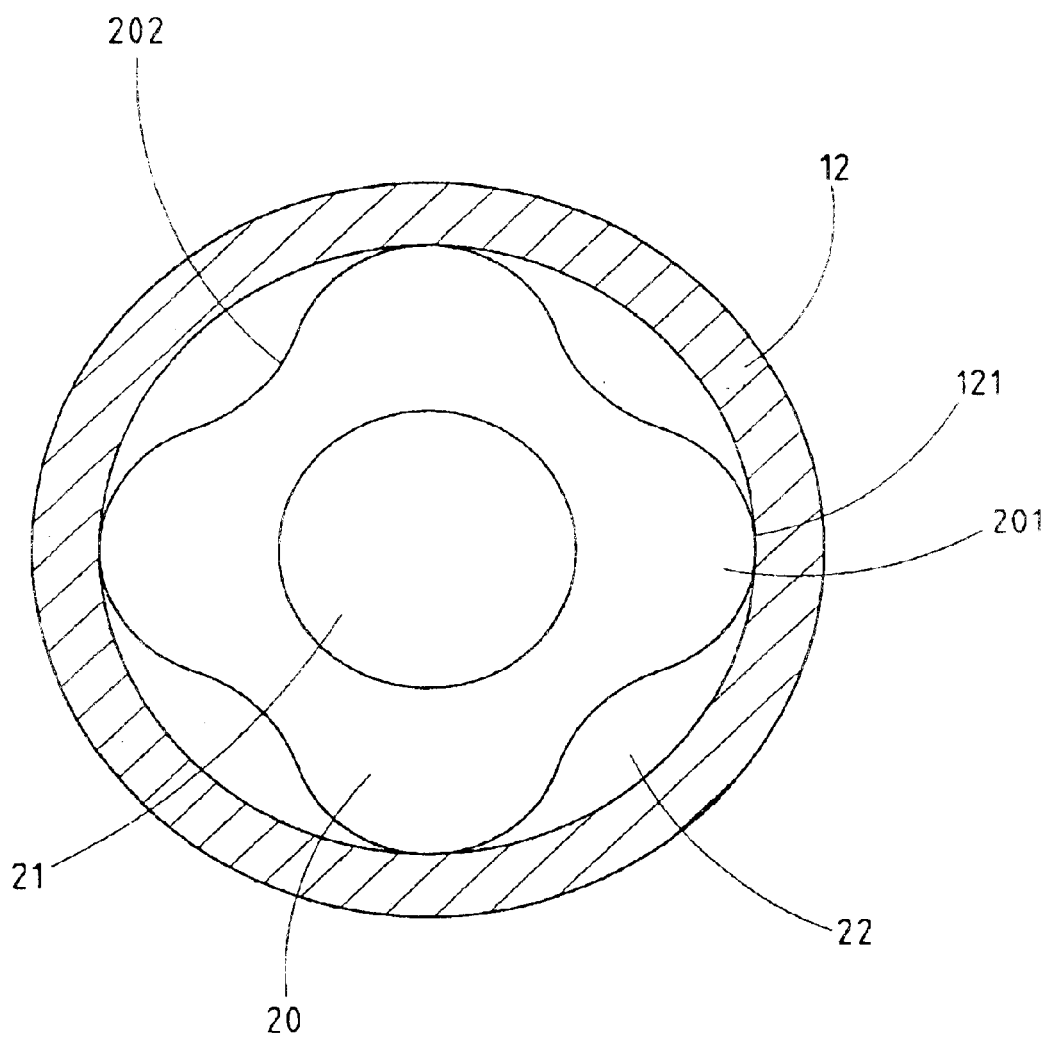
FIG. 5 shows an enlarged cross-sectional view of the spout of the first preferred embodiment of the present invention.
Figure 6:
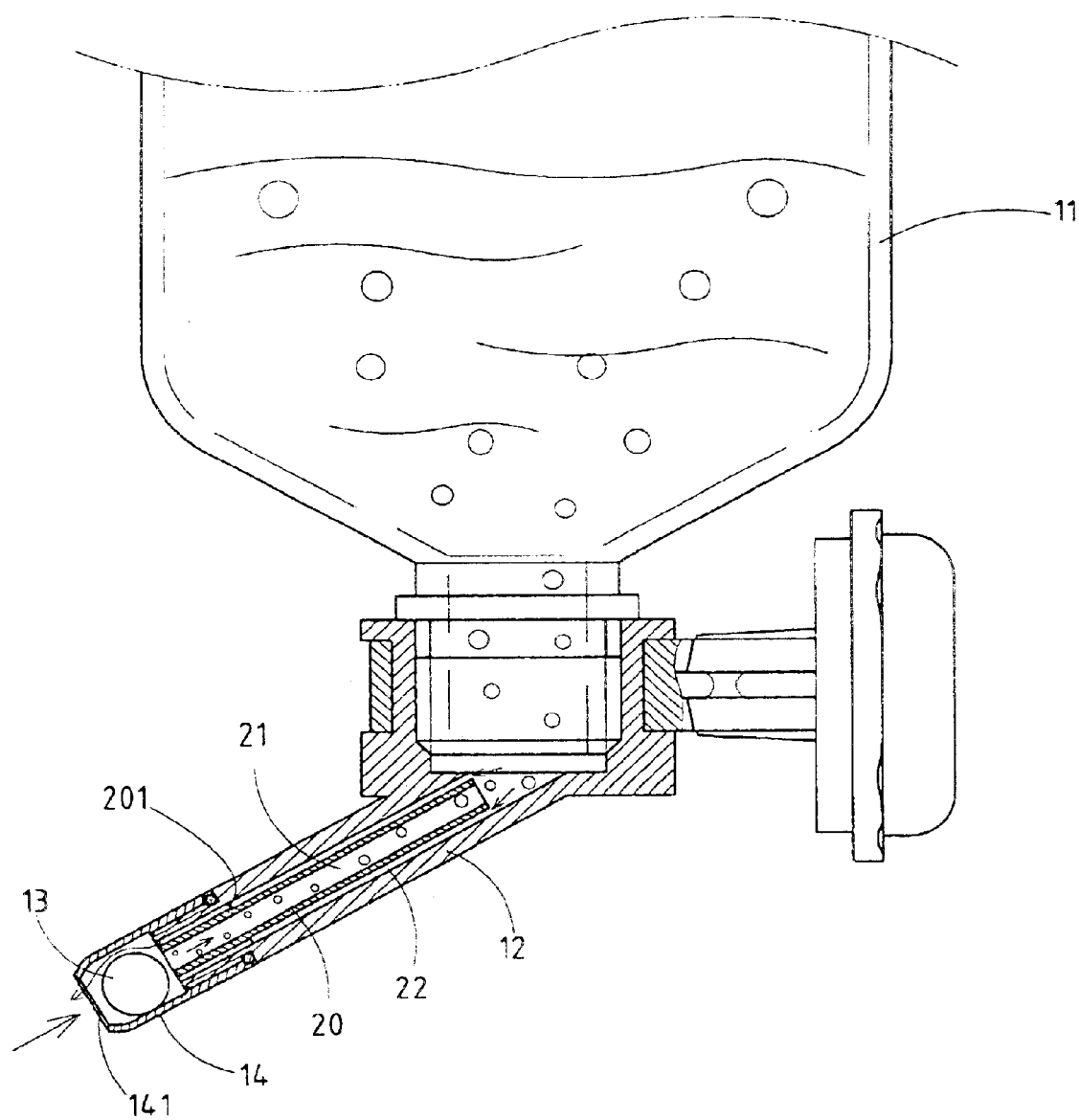
FIG. 6 shows a sectional schematic view of the first preferred embodiment of the present invention at work.
Figure 7:
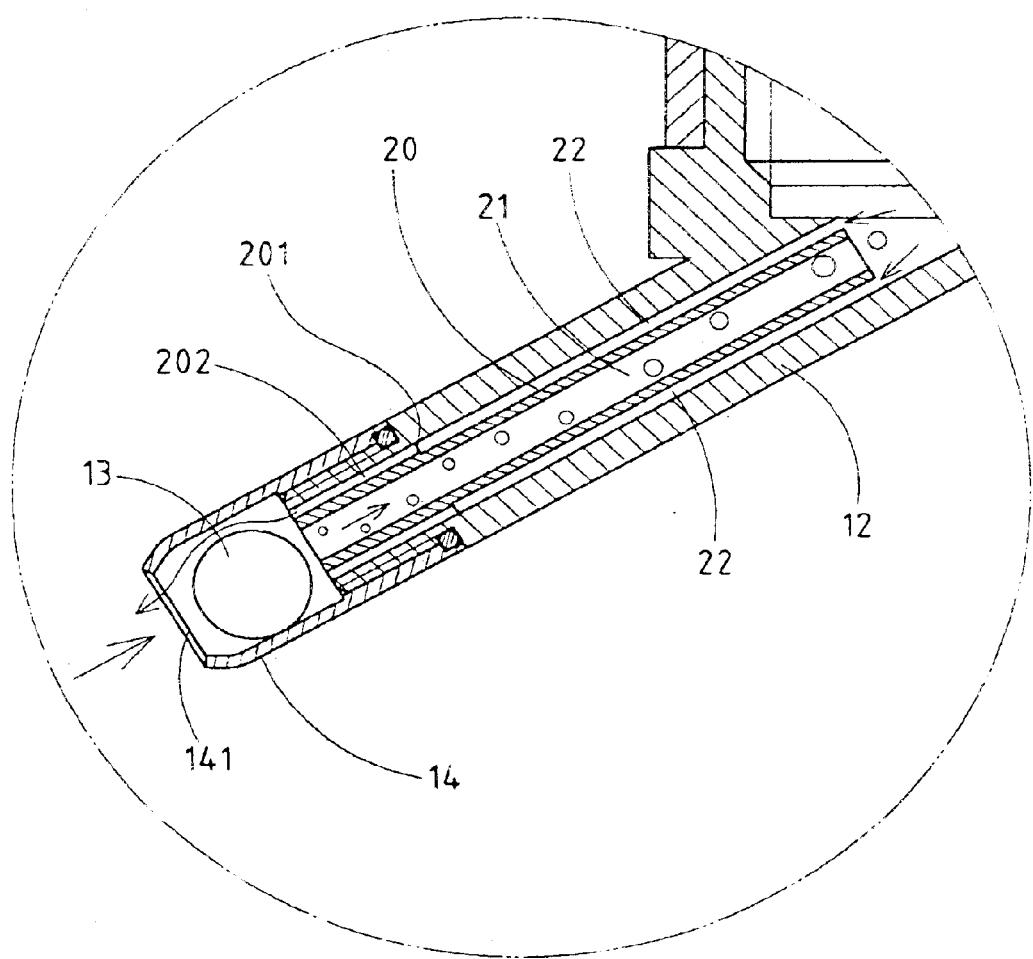
FIG. 7 shows an enlarged longitudinal sectional view of the spout of the first preferred embodiment of the present invention at work.
Figure 8:
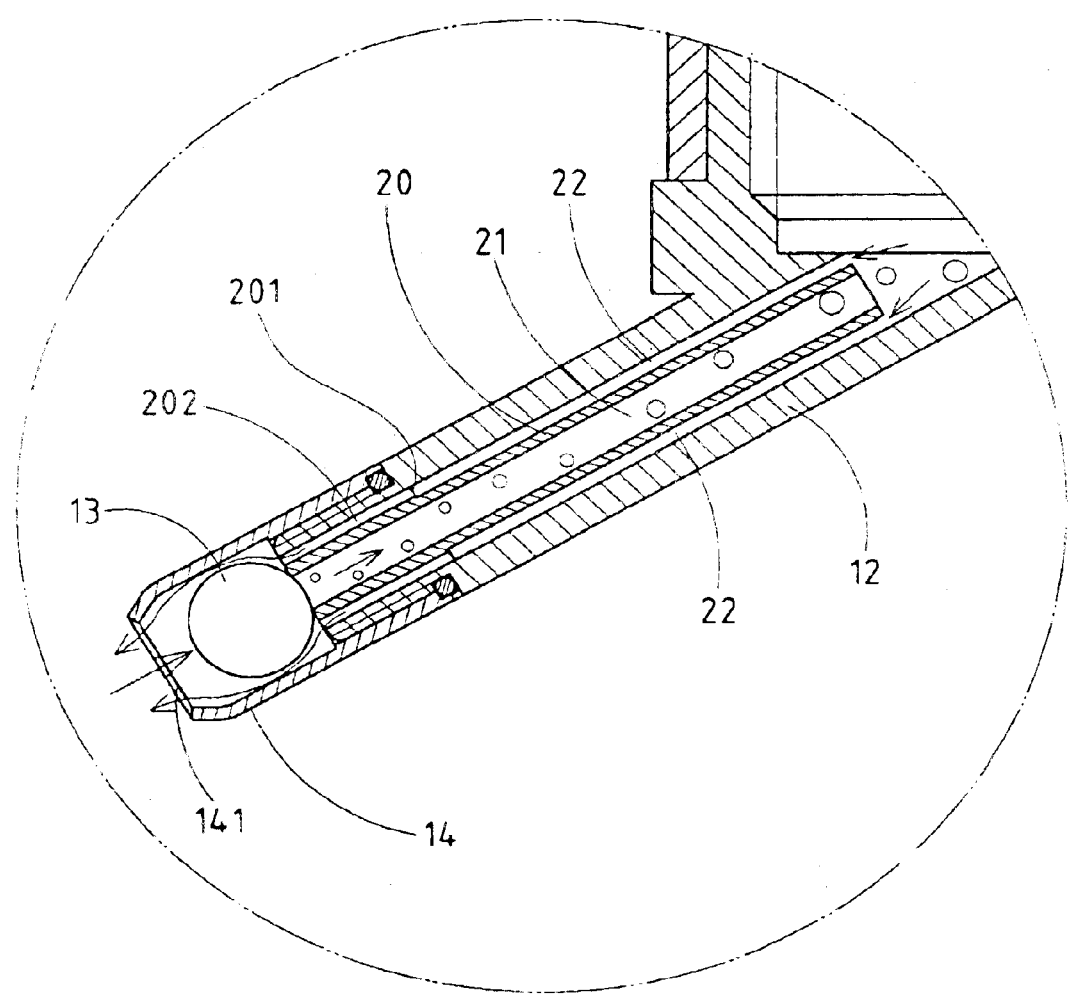
FIG. 8 shows another enlarged longitudinal sectional view of the spout of the first preferred embodiment of the present invention.
Figure 9:
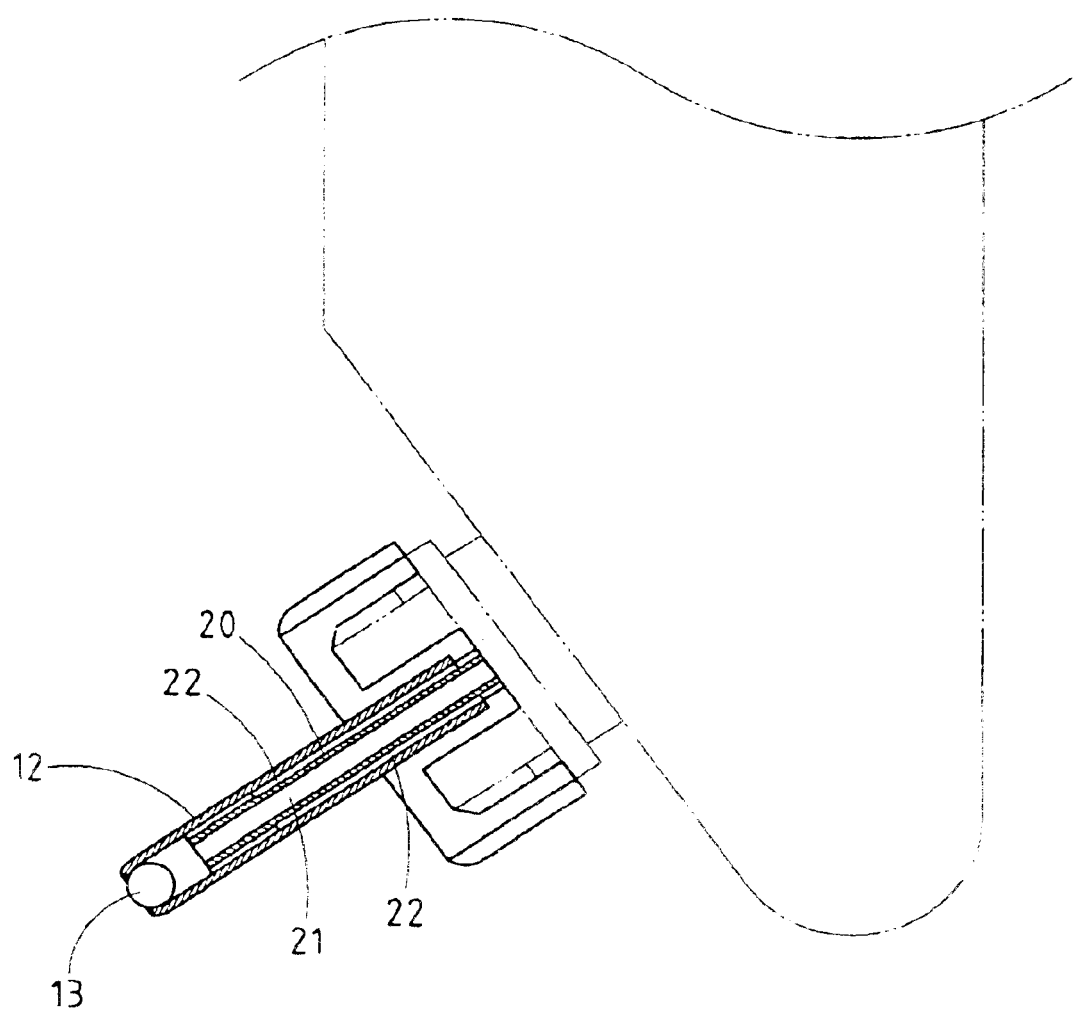
FIG. 9 shows a schematic view of another application of the first preferred embodiment of the present invention.

As shown in FIGS. 1–8, a pet drinking fountain 10 embodied in the present invention comprises a water reservoir 11, a spout 12, a stop ball 13, and a muzzle 14. The spout 12 is fastened at the inner end with the water reservoir 11, and at the outer end with the inner end of the muzzle 14 in which the stop ball 13 is movably contained such that the stop ball 13 is partially emerged from an opening 141 of the outer end of the muzzle 14. As the stop ball 13 is moved by the tongue of a pet, the water is discharged through the opening 141 of the muzzle 14. As soon as the tongue of the pet has withdrawn from the stop ball 13, the stop ball 13 returns to its original position to block the opening 141 of the muzzle 14. As a result, the spout 12 is shut off The pet drinking fountain 10 of the present invention is characterized by the spout 12 which is provided in the interior with an air tube 20. The air tube 20 has an air passage 21 extending through two longitudinal ends of the air tube 20. The air tube 20 is located in the interior of the spout 12 such that a water passage 22 is formed between the air tube 20 and an inner wall 121 of the spout 12, and that the air passage 21 of the air tube 20 is in communication with the hollow interior of the muzzle 14 and the interior of the water reservoir 11. Meanwhile, the water passage 22 is in communication with the hollow interior of the muzzle 14 and the interior of the water reservoir 11. As the stop ball 13 is moved by the tongue of a pet, the opening 141 of the muzzle 14 is no longer blocked, thereby allowing the passage of water through the opening 141 of the muzzle 14. The water flows from the water reservoir 11 into the muzzle 14 via the water passage 22. While the pet is licking the stop ball 13, atmospheric air is allowed to enter the water reservoir 11 via the air passage 21 of the air tube 20, as illustrated in FIGS. 6, 7, and 8.

Figure 10:
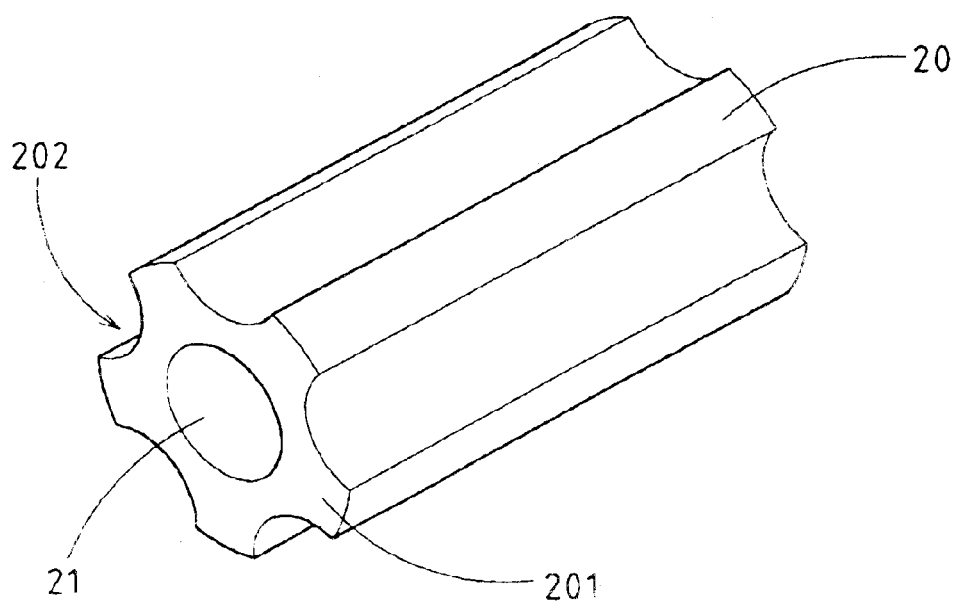
FIG. 10 shows a perspective view of a second preferred embodiment of the present invention.
Figure 11:
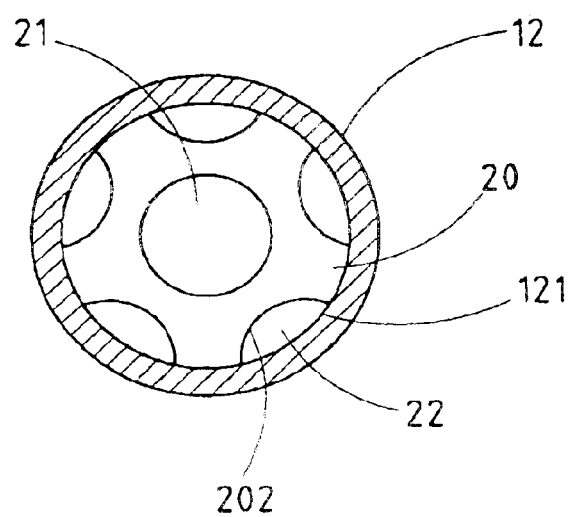
FIG. 11 shows a cross-sectional view of the second preferred embodiment of the present invention.

As shown in FIGS. 4 and 5, the outer end of the air tube 20 is provided in the outer wall thereof with a plurality of ridges 201 and grooves 202. The air tube 20 is securely located in the interior of the spout 12 by means of the ridges 201 which are in an intimate contact with the inner wall 121 of the spout 12. Meanwhile, a plurality of water passages 22 are formed between the inner wall 121 of the spout 12 and the grooves 202 of the air tube 20, as shown in FIG. 5. The ridges 201 and the grooves 202 have a predetermined length and extend along the longitudinal direction of the air tube 20. However, the ridges 201 and the grooves 202 are confined to the outer wall of the outer end of the air tube 20. The ridges 201 and the grooves 202 may extend through the outer end and the inner end of the air tube 20, as shown in FIG. 10. In another words, the ridges 201 and the grooves 202 are corresponding in length to the air tube 20.

Figure 12:
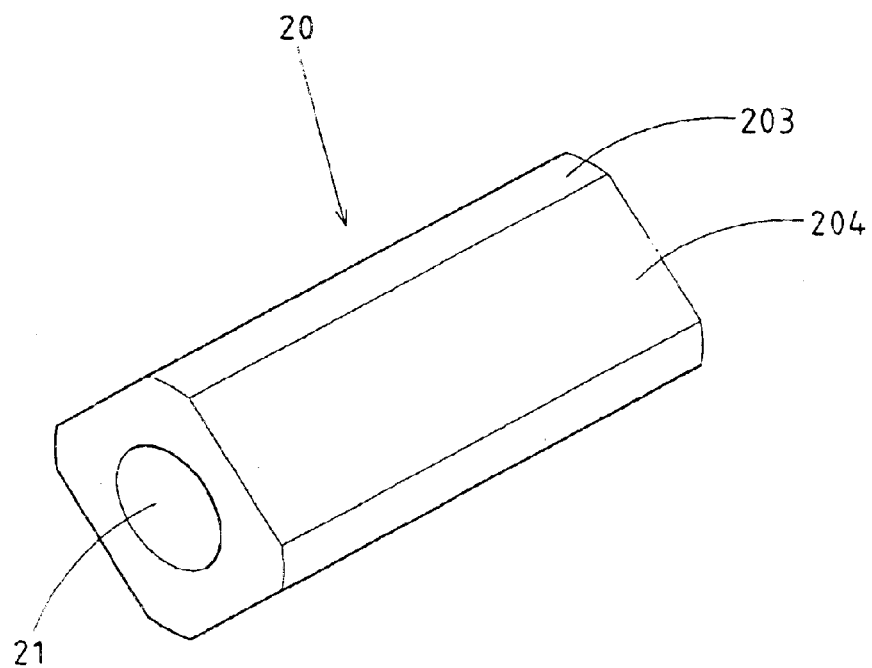
FIG. 12 shows a perspective view of a third preferred embodiment of the present invention.
Figure 13:
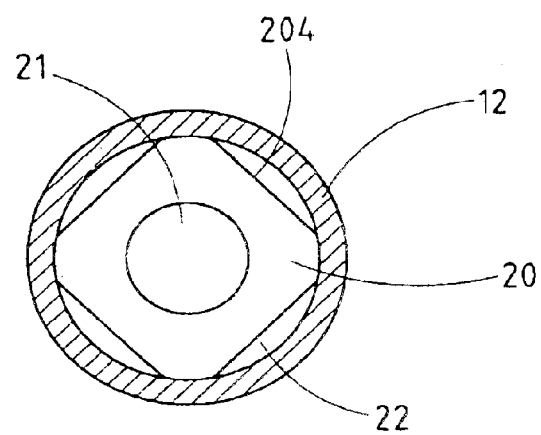
FIG. 13 shows a cross-sectional view of the third preferred embodiment of the present invention.

As shown in FIG. 12, the air tube 20 may be of an irregularly polygonal construction. In another words, the air tube 20 has a plurality of sides 203 and 204, which are different in width.

Figure 14:
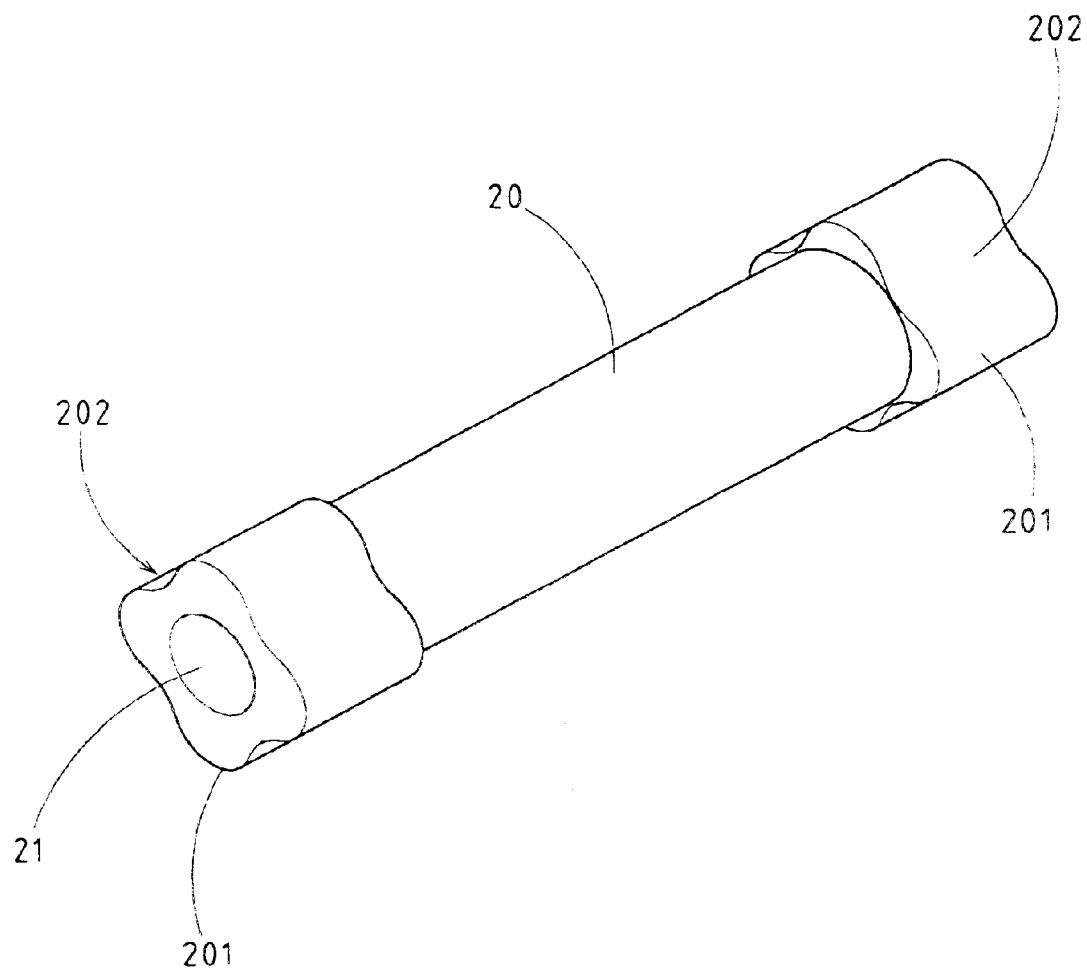
FIG. 14 shows a perspective view of a fourth preferred embodiment of the present invention.
Figure 15:
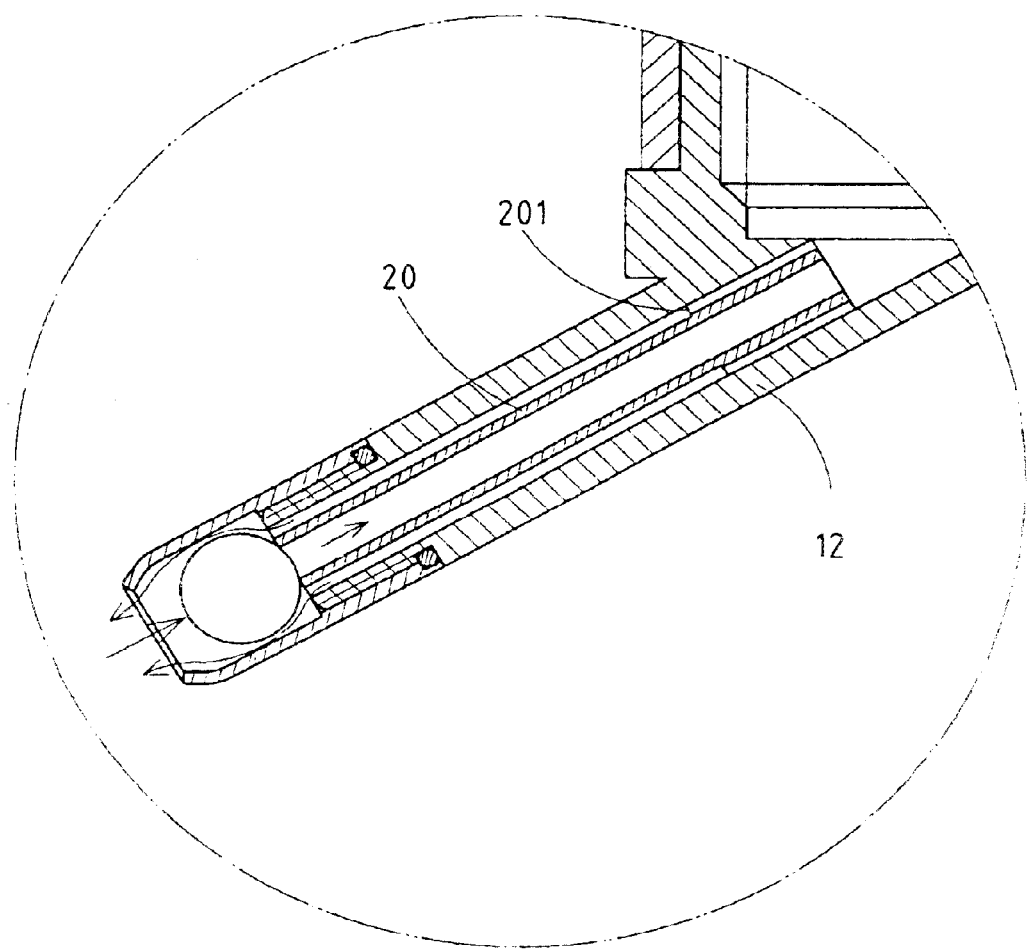
FIG. 15 shows a longitudinal sectional view of a fifth preferred embodiment of the present invention at work.
Figure 16:
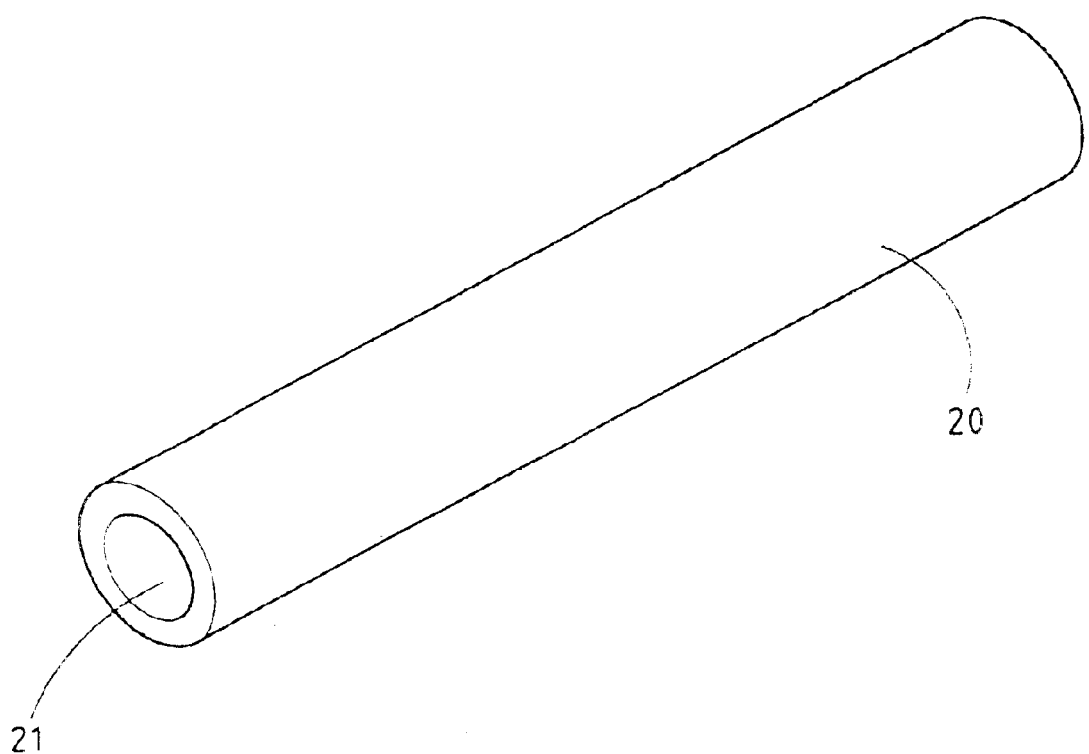
FIG. 16 shows a perspective view of a sixth preferred embodiment of the present invention.
Figure 17:
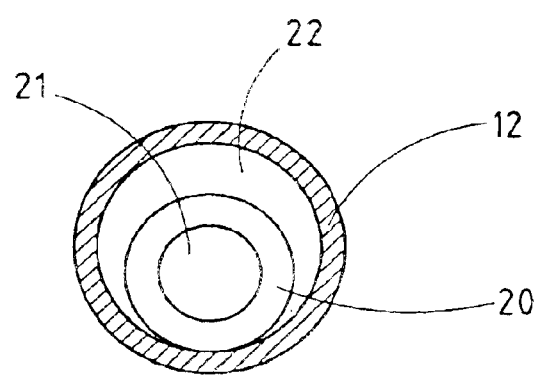
FIG. 17 shows a cross-sectional view of the sixth preferred embodiment of the present invention.
Figure 18:
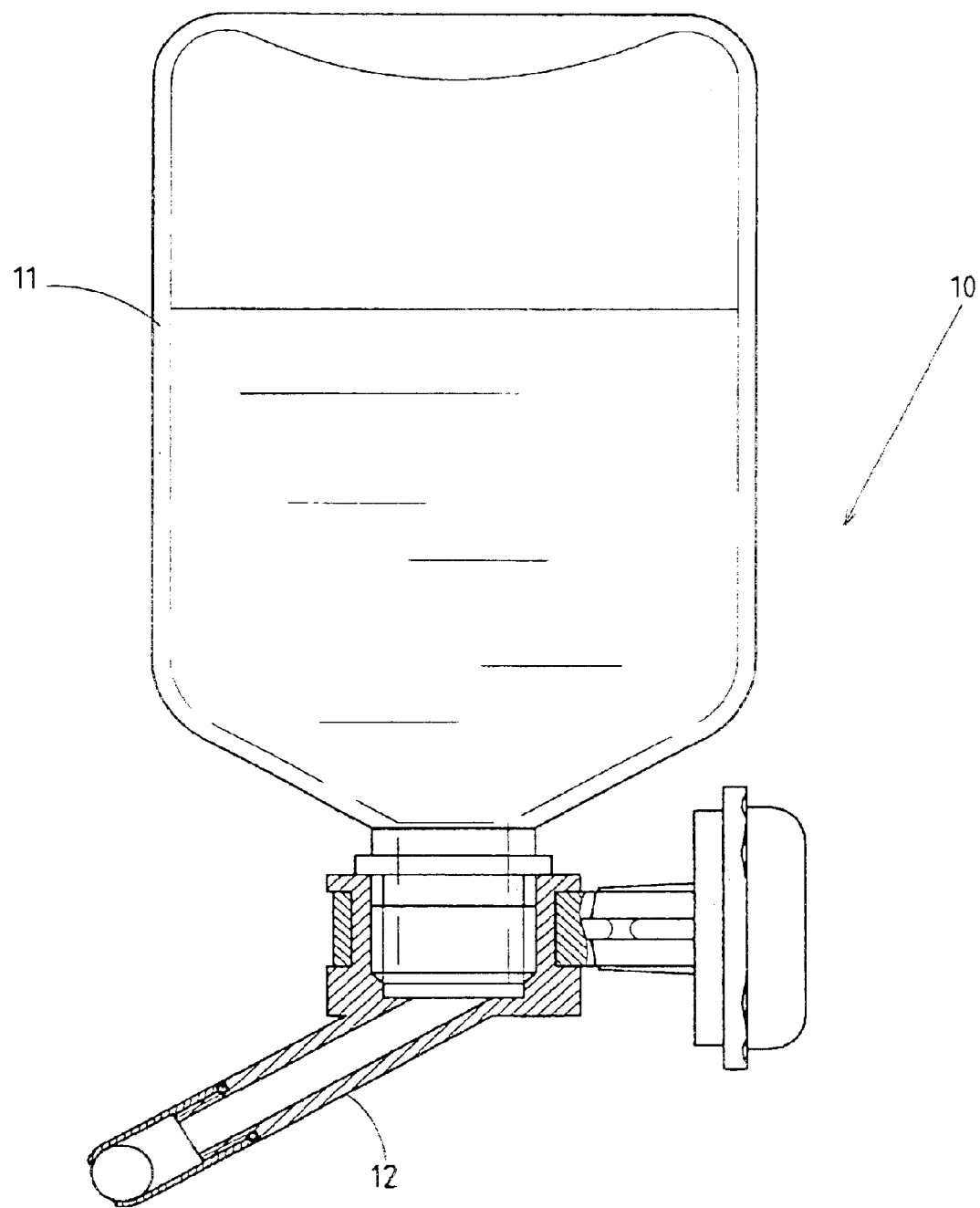
FIG. 18 shows a sectional schematic view of a pet drinking fountain of the prior art.

The air tube 20 may be provided with two locating portions which are formed of a plurality of ridges 201 and grooves 202 and are disposed at two longitudinal ends of the air tube 20, as shown in FIG. 14. The air tube 20 may be free of any locating portion which is formed of a plurality of ridges 201 and grooves 202, as shown in FIG. 16.

The present invention described above is to be regarded in all respects as being illustrative and nonrestrictive. Accordingly, the present invention may be embodied in other specific forms without deviating from the spirit thereof. For example, the air tube 20 of the present invention may be provided with more than two locating portions which are formed of a plurality of ridges 201 and grooves 202 and are disposed at intervals. The present invention is therefore to be limited only by the scope of the following claims.

I claim:
1. A pet drinking fountain comprising:
a water reservoir;
a spout comprised of a round longitudinal through hole and fastened at an inner end to said water reservoir such that said round longitudinal through hole of said spout is in communication with an interior of said water reservoir,
a muzzle comprising a hollow interior and an opening located at an outer end thereof such that said opening is in communication with said hollow interior, said muzzle being fastened at an inner end with an outer end of said spout such that said hollow interior of said muzzle is in communication with said round longitudinal through hole of said spout; and
a stop ball movably disposed in said hollow interior of said muzzle such that said stop ball is partially emerged from said opening of said muzzle;
wherein said spout is comprised of an air tube which is comprised of an air passage extending through two longitudinal ends of said air tube and is smaller in diameter than said longitudinal through hole of said spout whereby said air tube is disposed in said round longitudinal through hole of said spout such that said air passage of said air tube is in communication with the interior of said water reservoir and the hollow interior of said muzzle, and such that a water passage is formed between an outer wall of said air tube and an inner wall of said round longitudinal through hole of said spout, with said water passage being in communication with the interior of said water reservoir and the hollow interior of said muzzle.

2. The pet drinking fountain as defined in claim 1, wherein said air tube is round in cross section and is comprised of, in the outer wall, at least one locating portion whereby said locating portion is comprised of a plurality of ridges and grooves, said ridges being in an intimate contact with the inner wall of said round longitudinal through hole of said spout, said grooves forming with said inner wall of said round longitudinal through hole of said spout a plurality of water passages.

* * * * *